United States Patent [19]
Barshter et al.

[11] Patent Number: 5,861,303
[45] Date of Patent: Jan. 19, 1999

[54] BIOFILTRATION APPARATUS AND METHOD WITH CHEMICAL PRE-TREATMENT OF CONTAMINATED AIR

[75] Inventors: Dennis Wayne Barshter, Shamong; Michael Arthur Del Vecchio, Branchburg, both of N.J.

[73] Assignee: Envirogen, Inc., Lawrenceville, N.J.

[21] Appl. No.: 712,571

[22] Filed: Sep. 13, 1996

[51] Int. Cl.$^6$ .............................. C12S 5/00; C12M 1/36
[52] U.S. Cl. .................... 435/266; 435/3; 435/286.5; 435/294.1; 435/299.1
[58] Field of Search .......................... 435/266, 3, 286.5, 435/286.6, 289.1, 294.1, 299.1; 422/122, 123, 168, 169, 172, 171; 210/150, 612, 614–619; 423/210, 220, 237, 238

[56] References Cited

U.S. PATENT DOCUMENTS

| | | |
|---|---|---|
| H1337 | 7/1994 | Hoeppel . |
| 3,183,645 | 5/1965 | Teller . |
| 4,225,381 | 9/1980 | Ishikawa et al. . |
| 4,421,534 | 12/1983 | Walker . |
| 4,544,381 | 10/1985 | Schmidt . |
| 4,662,900 | 5/1987 | Ottengraf . |
| 4,758,417 | 7/1988 | Van Lookeren-Campagne et al. . |
| 4,760,027 | 7/1988 | Sublette . |
| 4,931,262 | 6/1990 | Sonta et al. . |
| 5,064,763 | 11/1991 | Bentz . |
| 5,077,025 | 12/1991 | Glass . |
| 5,082,475 | 1/1992 | Bentz . |
| 5,269,929 | 12/1993 | Sublette . |
| 5,279,963 | 1/1994 | Hobby . |
| 5,445,660 | 8/1995 | Koers . |
| 5,503,738 | 4/1996 | DeFilippi et al. . |
| 5,518,920 | 5/1996 | Stewart et al. . |
| 5,531,898 | 7/1996 | Wickham . |
| 5,595,910 | 1/1997 | Kant et al. . |

FOREIGN PATENT DOCUMENTS

| | | | |
|---|---|---|---|
| 2-115019 | 4/1990 | Japan | 422/122 |
| 3-161017 | 7/1991 | Japan | 422/122 |
| 6-226034 | 8/1994 | Japan . | |
| 6-226035 | 8/1994 | Japan | 422/122 |

OTHER PUBLICATIONS

Eitner et al. "Chemical–biological process combination for decomposition of extreme waste gas emissions form a sewage treatment plant." VDI–Ber. vol. 1104 (1994), pp. 481–489.

Forbes, Jr. et al. "Combined strategies for odor control." BioCycle. vol. 35 (1994), pp. 49–54.

English Translation of JP 03–161017, Oct. 1997.

English Translation of JP 06–226034, Sep. 1997.

Knauf. "Biofilter applications with high concentrations of hydrogen sulfide in a waste water treatment plant and an oil mill." Proc., Annu. Meet.–Air Waste Manage. Assoc. 88th (vol. 4A)(1995).

*Primary Examiner*—William H. Beisner
*Attorney, Agent, or Firm*—Ratner & Prestia

[57] ABSTRACT

An apparatus and method is provided for removing contaminants from a gas, wherein the gas flows through a gas treatment chamber having a biological treatment zone and a chemical treatment zone. The amount of a chemical treatment agent that is introduced into the chemical treatment zone is adjusted in response to a sensed condition or conditions.

26 Claims, 4 Drawing Sheets

BIOFILTRATION APPARATUS AND METHOD WITH CHEMICAL PRE-TREATMENT OF CONTAMINATED AIR

BACKGROUND OF THE INVENTION

This invention relates to an apparatus and method for treatment of contaminated gases. More particularly, this invention relates to gas treatment by biofiltration with chemical pre-treatment.

FIELD OF THE INVENTION

There has been an increased demand for systems adapted to remove contaminants from gases such as air. This increased demand is due, in part, to the enactment of strict governmental regulations regarding emissions.

Significant advances have been made since the introduction of gas treatment systems that utilize filtration material and microorganisms to combat gas contaminants, commonly referred to as biofilters or biofiltration. However, optimization of such treatment systems poses several challenges.

High concentrations of contaminants in the gas may be toxic to the microorganisms in the filtration material. Elevated concentrations may also exceed the capacity of the microorganisms to treat the contaminants, or they may exceed the capacity of the filtration material to absorb the contaminants for treatment. For example, sudden increases in contaminant concentration have been discovered to overload the filtration material so that the contaminants cannot be adequately removed. In some circumstances, an increased contaminant level becomes toxic to the microorganisms that otherwise thrive in the filtration material.

Extreme temperatures also compromise the ability of microorganisms to eliminate contaminants. Many biofilters are operated outdoors under various environmental and meteorological conditions. Although such biofilters may perform adequately in moderate temperature ranges, elevated temperatures in warm climates and frigid temperatures in cold climates can detrimentally impact biofilter efficiency. Other challenges are posed as well.

Over the years, many attempts have been made to improve systems for decontaminating gas. For example, U.S. Pat. No. 4,421,534 to Walker describes a tower for removing odors from gases by passing the gases through biochemical contact media. Sprayheads in the Walker apparatus spray treatment liquid onto an upper portion of a media column to provide a food supply for odor-removing microorganisms. A "clean-up" treatment is performed in the Walker apparatus with a chemically active odor-removing liquid introduced onto a thin media layer that is positioned above the media column.

U.S. Pat. No. 4,662,900 to Ottengraf describes a method for biological treatment of waste gases from wastewater. In the Ottengraf method, gases are sprayed with water in a pre-treatment chamber wherein water-soluble components of the gas stream are partially dissolved and removed. The gas is then urged according to Ottengraf through a biologically active zone in a filter unit before it is discharged. The temperature of the Ottengraf filter unit is controlled by heating or cooling the water that is introduced into the pre-treatment chamber.

U.S. Pat. No. 5,064,763 to Bentz describes a biological process for purifying waste air. In the Bentz process, a basic compound is added to waste air before it enters a biofilter to counteract excessive biofilter acidity and an associated reduction in biological breakdown. The basic compound is metered by Bentz depending on pH measured in the biofilter or elsewhere.

U.S. Pat. No. 5,082,475, also issued to Bentz, describes a system for disposal and purification of waste air using biofilters containing microorganisms. Buffers are arranged by Bentz upstream of biofilters for storage and continuous release of pollutants to the biofilters.

U.S. Pat. No. 5,445,660 to Bonno Koers, incorporated herein by reference, describes an improved apparatus for biofiltration of contaminated gases. The Koers apparatus includes a chamber with a gravel layer and a layer of filtration material positioned above the gravel layer. The Koers apparatus sprays water onto the gravel layer so that contaminated gas is humidified as it travels through the gravel layer, thereby supplying moisture to the filtration material. The Koers apparatus pre-heats the gas to be treated using heat released during bio-activity in the filtration material. Although the Koers apparatus represents a significant advance over prior systems, there remains a continued demand for further improvements.

OBJECTS OF THE INVENTION

It is an object of the invention to provide an apparatus and method capable of detecting conditions adverse to biofilter performance and compensating for reduced biofilter performance.

Other objects will be apparent to those of skill in this art in view of the following descriptions.

SUMMARY OF THE INVENTION

This invention relates to an apparatus and method for removing contaminants from a gas. The gas is forced into contact with a biological treatment agent positioned within a gas treatment chamber as well as a chemical treatment agent that is introduced into the chamber. The amount of chemical treatment agent that is introduced is adjusted in response to a sensed condition.

A chemical treatment zone is positioned in the chamber. The chemical treatment agent is introduced from a source into the chemical treatment zone. A biological treatment zone is positioned in the chamber adjacent to the chemical treatment zone.

A sensor detects one or more conditions indicative of the ability of the biological treatment zone to treat gas contaminants. A controller connected to the sensor adjusts the amount of chemical treatment agent that is introduced into the chemical treatment zone in response to the sensed condition or conditions.

In operation, contact is caused between the chemical treatment agent and the contaminated gas, thereby inducing a chemical reaction. Also, contact is caused between a microbe population in the biological treatment zone and the gas, thereby inducing a biological reaction. Chemical treatment is adjusted in response to the sensed condition or conditions to at least partially compensate for any anticipated decrease in the performance of the biological treatment.

DESCRIPTION OF THE INVENTION

In the description which follows, the invention is described with respect to particular forms selected for illustration in the drawings, and specific terms are used in describing those forms. The use of such drawings and such terms is not intended to define or limit the scope of the invention, which is defined separately in the appended claims.

Figure 1:
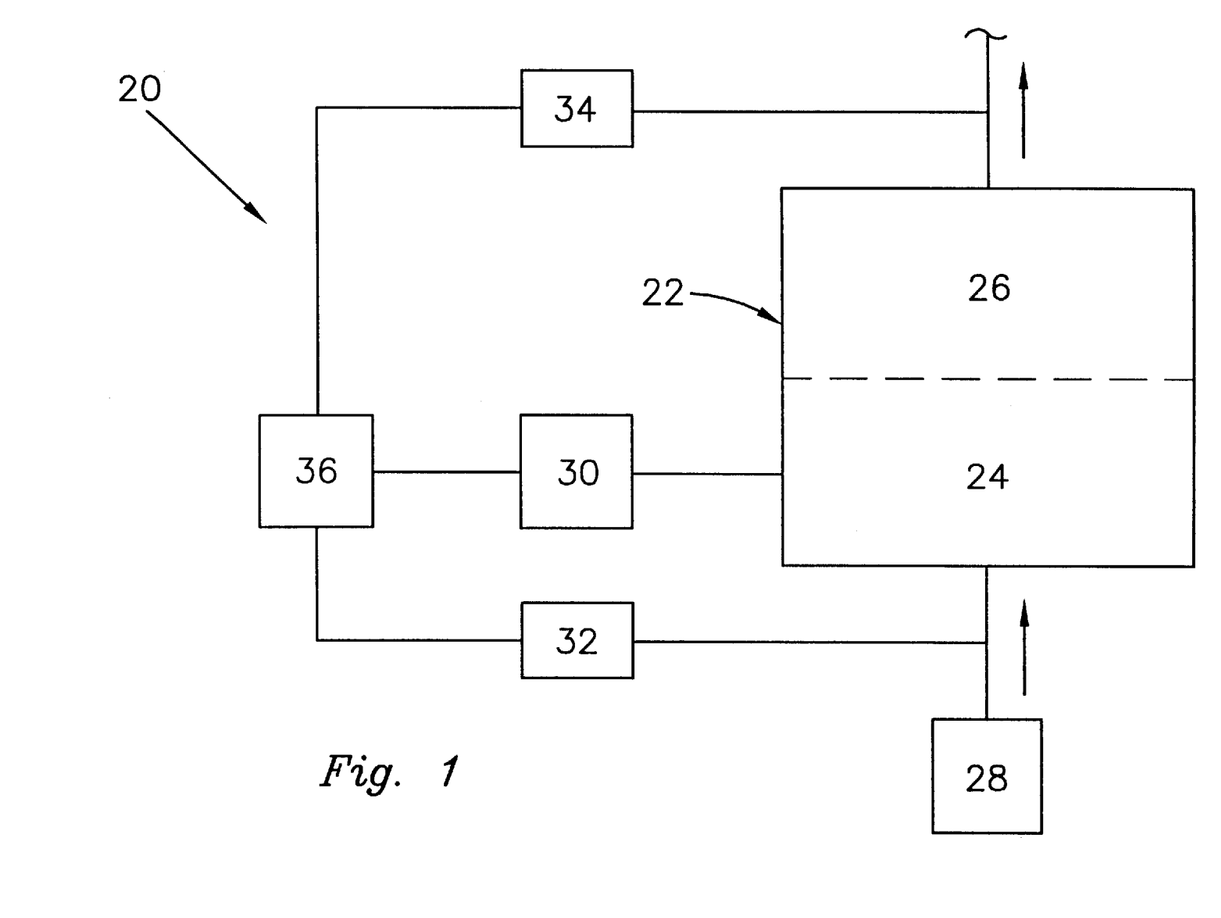
FIG. 1 is a schematic illustration of an embodiment of this invention.

FIG. 1 provides a schematic illustration of an embodiment of this invention. The numeral "20" generally designates a gas treatment system including a gas treatment chamber 22 with a chemical treatment zone 24 upstream from a biological treatment zone 26. Contaminated gas is introduced into gas treatment chamber 22 from a source 28 of contaminated gas in the direction generally indicated by the arrow. Treated gas is delivered from gas treatment chamber 22 in the direction generally indicated by the arrow for release to the atmosphere or for further handling or treatment, depending upon the application.

A source 30 of a chemical treatment agent is connected to gas treatment chamber 22 to introduce a chemical treatment agent into chemical treatment zone 24 for contact with gas flowing through chemical treatment zone 24. In this particular embodiment, two sensors 32, 34 are utilized in system 20 to detect at least one sensed condition indicative of the ability of biological treatment zone 26 to treat the contaminants in the gas. A controller or control system 36 is connected to sensors 32, 34 and to source 30 of the chemical treatment agent. Controller 36 adjusts the amount of chemical treatment agent that is introduced by source 30 into chemical treatment zone 24 in response to conditions sensed by sensors 32, 34.

Figure 2:
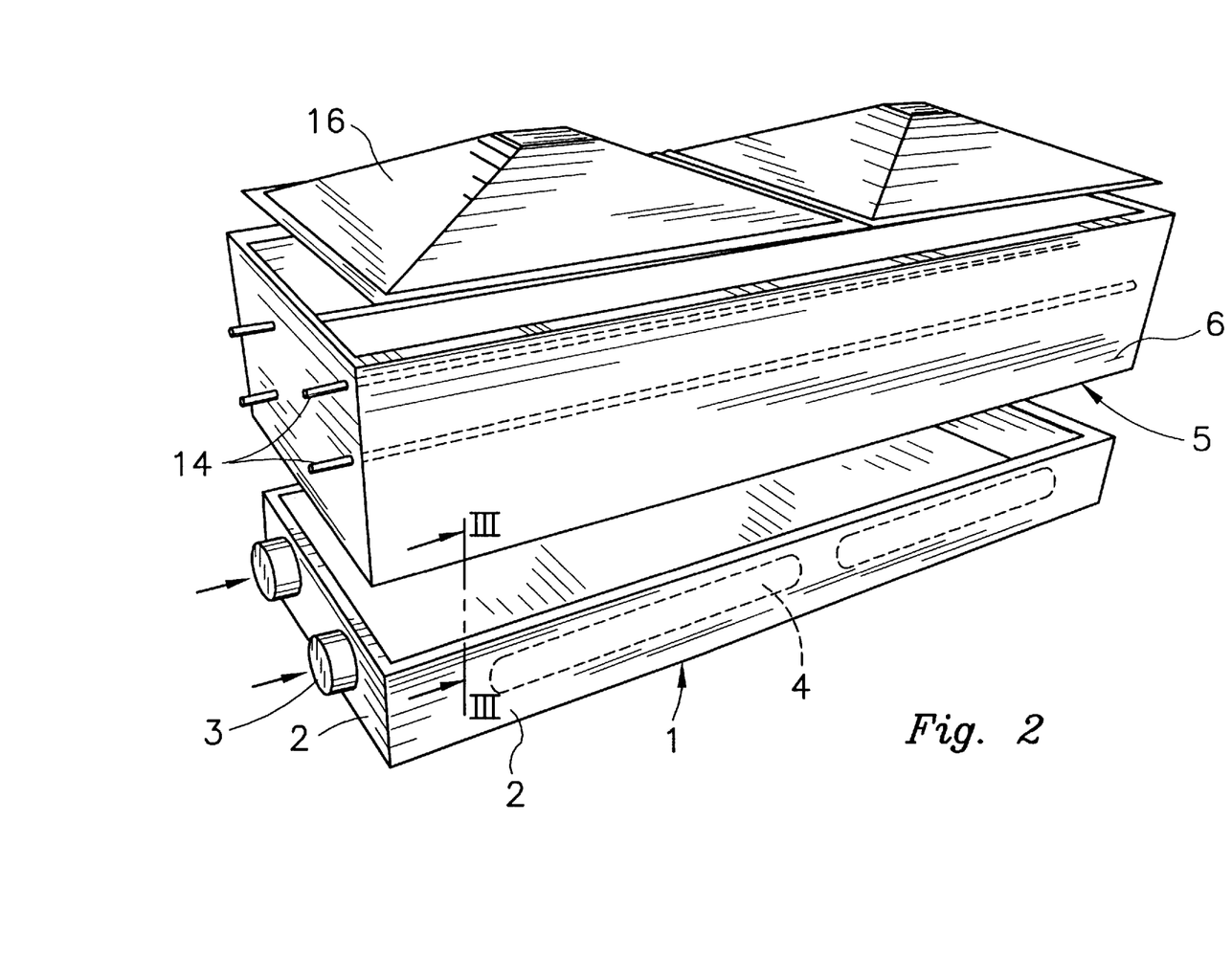
FIG. 2 is a perspective view of an embodiment of an apparatus according to this invention, shown in exploded format for clarity.
Figure 3:
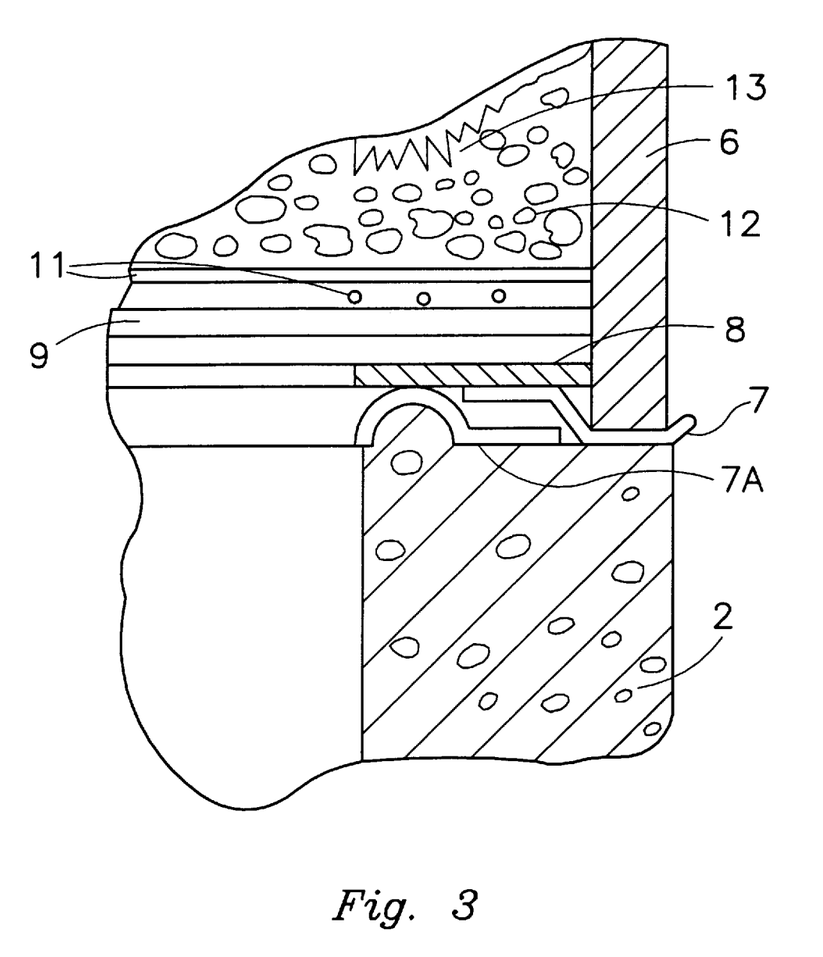
FIG. 3 is a cross-sectional side view of a detail of the embodiment shown in FIG. 2, as defined in FIG. 2.
Figure 4:
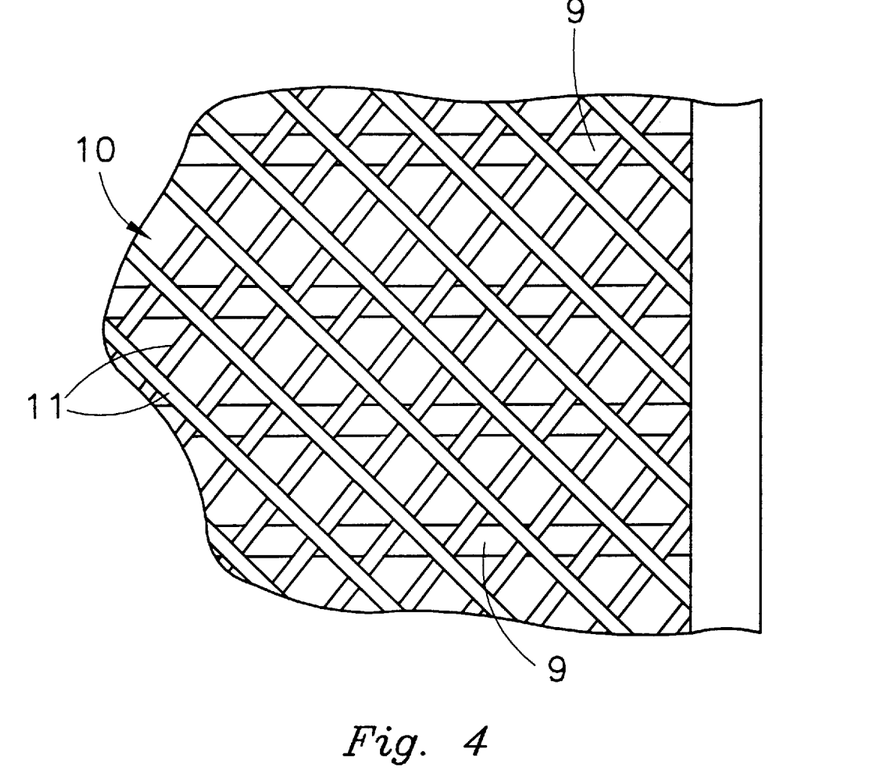
FIG. 4 is a top view of a portion of the embodiment shown in FIG. 2.

A preferred embodiment of an apparatus according to this invention is illustrated in FIGS. 2–4, which show an example of an apparatus capable of removing contaminants from a supply of gas such as air. Odorous or otherwise contaminated gas or air is often the product of treatment processes such as those conducted at wastewater or soil treatment facilities. Contaminated gases are also encountered in connection with the composting, paper and pulp, food, petrochemical, printing and automotive industries, among others. Examples of gas contaminants include aliphatic hydrocarbons, aromatic hydrocarbons and chlorinated hydrocarbons. Specific examples include reduced sulfurs and volatile organic compounds (VOCs) (from wastewater, for example), anmmonia (from composting, for example), mercaptans (from paper and pulp, for example), and other contaminants associated with various treatment facilities and industries. Examples of oxygenous compound contaminants include phenols, alcohols, aldehydes, ketones, formaldehydes and tetrahydrofuranes. Examples of nitrogen compound contaminants include amines, ammonia and acetonitrile. Examples of sulfur compound contaminants include $H_2S$, mercaptans and carbon disulfide.

A preferred apparatus is configured so that contaminated gas is forced into contact with a chemical treatment agent injected into a gas treatment chamber through which the gas flows as well as a biological treatment agent positioned within the chamber. The preferred apparatus is adapted to adjust the amount of the chemical treatment agent that is introduced into the gas treatment chamber.

The gas treatment chamber has a wall defining a passage through which the gas preferably flows upwardly from a lower portion of the gas treatment chamber to an upper portion of the gas treatment chamber. Contaminated gas is delivered to the gas treatment chamber in any known manner, such as by blowers and other gas handling equipment, for example. After treatment in the gas treatment chamber, the gas is vented to the atmosphere or otherwise handled.

Referring to FIG. 2, which illustrates a preferred apparatus according to this invention in exploded format, an air supply room 1 is provided on which a gas treatment chamber 5 is mounted. Air supply room 1 has upwardly extending walls 2 and air connections 3 at an end wall 2 through which air or gas to be treated is introduced into air supply room 1 in the direction generally indicated by the arrows. Optional openings 4, shown in phantom in FIG. 2, are provided in one or more side walls 2 of air supply room 1 so that multiple air supply rooms can be interconnected adjacent one another for air flow between the rooms, if desired. Although air supply room 1 is illustrated in FIG. 2 for the sake of illustration, that component is not considered an integral or necessary part of an apparatus according to this invention.

Still referring to FIG. 2, gas treatment chamber 5 has upwardly extending walls 6 located for positioning over walls 2 of the air supply room 1. In one wall 6 of gas treatment chamber 5, multiple inlet tubes 14 are provided, the purpose of which will be described later. Inlet tubes 14 are preferably provided with nozzles located within gas treatment chamber 5.

Because the apparatus is positioned outdoors in most cases, gas treatment chamber 5 is preferably covered by a roofing construction 16. The main purpose of roofing construction 16 is to prevent rain water or other materials from falling into gas treatment chamber 5. In the embodiment illustrated in FIG. 2, roofing construction 16 is shown to consist of two equal parts. A variety of configurations are contemplated.

Gas treatment chamber 5 is preferably formed with a modular construction. Most preferably, modules are transportable by trucks and other means. Such modular construction permits removal and replacement of chambers in case they are damaged or for any other reason. Materials used for gas treatment chamber 5 are selected, for example, from concrete, polyester, polyethylene and other suitable materials.

Referring to FIG. 3, a detail of an embodiment of the connection between air supply room 1 and gas treatment chamber 5 is illustrated. A suitable seal is preferably formed between walls 2 of air supply room 1 and walls 6 of gas treatment chamber 5. In this embodiment, the bottom edge of walls 6 is provided with a sealing strip 7 of flexible material. A similar strip 7A is attached to the top edge of walls 2. When air supply room 1 and gas treatment chamber 5 are stacked, a double seal is obtained. Flexible sealing strip 7 is captured between walls 6 and walls 2, and flexible sealing strip 7A is captured between walls 2 and an inwardly extending portion 8 of walls 6.

A chemical treatment zone is preferably positioned within the lower portion of the gas treatment chamber. The chemical treatment zone includes a substrate onto which a chemical treatment agent is introduced, as will now be described.

Referring to FIGS. 3 and 4, rods 9 or the like are provided in between the walls 6 of gas treatment chamber 5 for supporting a grating mat 10. Grating mat 10 preferably consists of plastic wires 11 that are placed across one another and are preferably welded to each other.

As an example of a suitable substrate for the chemical treatment zone, a layer of substrate material 12 rests within the lower portion of gas treatment chamber 5 above grating mat 10 and rods 9. Although slag, pumice or other porous materials are preferred substrates, equivalent and alternative materials are of course contemplated.

A source of chemical treatment agent (not shown in FIGS. 2-4) is connected to the gas treatment chamber and positioned to introduce the chemical treatment agent into the chemical treatment zone, onto the substrate within the chemical treatment zone and into contact with gas that preferably flows upwardly through the chemical treatment zone. The chemical treatment agent is selected depending upon the nature of the contaminants in the gas.

Examples of chemical treatment agents include chlorine solutions, sodium hydroxide, bicarbonate of soda, sulfuric acid and other chemical solutions capable of treating gas contaminants. For example, sodium hydroxide or bicarbonate of soda reacts with hydrogen sulfide, sulfuric acid reacts with ammonia, and sodium hypochlorite reacts with various VOCs. Most preferably, chemicals are chosen with relatively low vapor pressures so that they do not reach the biological treatment zone, as will be described later. Additional chemical treatment agents are of course contemplated, and the agents and contaminants mentioned herein for purposes of illustration are optionally substituted with any known contaminants and any known agents capable of treating those contaminants.

Referring to the embodiment shown in FIG. 2, the chemical treatment agent is introduced into gas treatment chamber 5 from a source (not shown in FIG. 2) by means of inlet tubes 14 which are positioned above or within the chemical treatment zone and the zone's substrate. Nozzles on inlet tubes 14 are positioned accordingly. Further details regarding the manner in which the chemical treatment agent is introduced are provided later.

It is preferred that a component of the chemical treatment agent is water for humidification of the gas, as described in the Koers patent, which is incorporated herein by reference. Alternatively, water is separately introduced into the system.

A biological treatment zone is preferably positioned within an upper portion of the gas treatment chamber above the chemical treatment zone. The biological treatment zone includes a filtration substrate and a microbe population inoculated into the filtration substrate. The microbe population is positioned for contact with the gas as it preferably flows upwardly through the biological treatment zone after exiting the chemical treatment zone.

Referring to FIG. 3, a layer of biofiltration material 13 is shown in a position above the layer of substrate 12, although a grating mat similar to grating mat 10 is contemplated between the layer of biofiltration material 13 and the layer of substrate 12 in order to more clearly define a boundary between the chemical treatment zone and the biological treatment zone. Biofiltration material 13 includes a filtration substrate and a microbe population.

Although various filtration substrates are contemplated, the filtration substrate is preferably an organic material into which a microbe population can be inoculated and within which the microbe population can thrive. Also, the filtration substrate is preferably adapted to hold a significant amount of moisture, which is of course beneficial to microbe survival.

The filtration substrate is most preferably wood that will not shrink significantly with age and that is porous for water retention. One example of a suitable filtration substrate is sold under the trade name VAM Filter Material, which is currently available through CVT AMERICA, LLC, Princeton Research Center, 4100 Quakerbridge Road, Lawrenceville, N.J. 08648. Other suitable materials, available through the same source, include filtration substrates sold under the trademarks CONFIL and BIOMAT.

Additives are optionally added to the filtration substrate to optimize performance of the biological treatment zone. For example, limestone particles are optionally added to biofiltration material 13 for applications involving removal of reduced sulfurs from contaminated gas. Also, activated carbon is optionally added to biofiltration material 13 for applications involving the removal of hydrocarbons from contaminated gas.

An appropriate microbe population is preferably selected based on the filtration substrate used in the biological treatment zone as well as the contaminant or contaminants in the gas to be treated. The filtration substrate itself often contains some indigenous microbes. Preferably, indigenous microbes that are naturally occurring in the filtration substrate are supplemented by a panel of microbes inoculated into the substrate. The inoculated microbes are preferably naturally occurring microbes that are not recombinant, although recombinant microbes are contemplated. The inoculum is optionally a pure culture or a mixed culture of bacteria.

A variety of bacteria suitable for inoculation in a filtration substrate according to this invention are commercially available. One example of a suitable microbe population is available under the trademark PHENOBAC, available from Polybac, 3894 Courtney Street, Bethlehem, Pa. 18017-8999. Other suitable microbe populations are contemplated. Growth stimulants and nutrients are preferably added as well, and the concentration of bacteria in the filtration substrate is preferably adjusted for the particular application.

Bacteria in the microbe population are often naturally selecting, depending upon factors such as the filtration substrate used in the biological treatment zone and the gas contaminants being treated. For example, bacteria inoculated into the filtration substrate preferably contain a variety of species. Due to a variety of factors, perhaps only a relatively small number of the species survive over time and remain to perform the task of gas decontamination. Different bacteria species or strains are expected to survive in different applications, depending upon whether or not a particular contaminant is toxic to the species or strains, whether or not species or strains can survive on a selected filtration substrate, environmental conditions, and other factors.

It is also recognized that different bacteria may perform different reactions, concurrently or separately. For example, one particular bacterial strain may convert ethanol to acetaldehyde while another bacterial strain may convert acetaldehyde to carbon dioxide and water. Other contaminants and byproducts are contemplated. For this reason, a microbe population is preferably selected based upon a variety of factors, including the selected filtration substrate and the gas contaminants to be treated.

According to another aspect of this invention, a sensor (not shown in FIGS. 2-4) is used to detect at least one sensed condition that is indicative of the ability of the biological treatment zone to treat contaminants in the gas. The sensor preferably monitors the gas for conditions that have some impact on biofilter efficiency.

As previously discussed, it has now been discovered that temperature extremes and elevated contaminant concentrations are highly relevant to the performance of the biological treatment zone. Nevertheless, additional sensed conditions are contemplated. For example, pH variations in the biological treatment zone, pressure drop across the filtration bed, meteorological conditions and other variables are optionally sensed.

In one preferred embodiment of this invention, the sensor includes means for sensing the concentration of contaminants in the gas. The nature and type of the sensor selected for use in this embodiment may depend upon the gas contaminant to be sensed. For example, in order to measure the concentration of VOCs, the use of a gas chromatograph may be preferred. Flame ionization detectors and organic vapor analyzers are also contemplated, depending on the application.

Various sensors are commercially available. For example, EIT Gas Detection Instrumentation, located at 251 Welsh Pool Road, Exton, Pa. 19341, offers toxic gas sensors and transmitters under the trademarks SENSOR STIK (Series 4500) and TWISTIK (Series 4700). The EIT sensors are electrochemical, gas diffusion-type sensors that are capable of sensing a variety of toxic gases. Also, Davis Instruments, located at 4701 Mount Hope Drive, Baltimore, Md. 21215, offers a series of multi-purpose gas detectors (Model Nos. 3200, 4200, 5200, 6200, 7200, 8200 and 9200) as well as an air quality (VOC) sensor (Model No. PSI-10) for detecting a range of contaminants.

In another preferred embodiment, the sensor includes means for sensing the temperature of the gas, the temperature of the filtration bed, or ambient temperature conditions. Temperature sensors are commercially available in a wide variety of forms. For example, resistance temperature devices (RTDs) and thermocouples are preferred, although other temperature sensors are contemplated as well.

In yet another preferred embodiment, the sensor includes means for sensing meteorological conditions such as wind speed, wind direction, humidity and other conditions.

In the most preferred embodiment, both contaminant concentration and temperature are sensed. Sensors are optionally positioned upstream of the biological treatment zone, upstream of the chemical treatment zone, downstream of the biological treatment zone, downstream of the chemical treatment zone, or within or adjacent to the chemical treatment zone or the biological treatment zone. Most preferably, sensors are positioned both upstream and downstream of the biological treatment zone in order to sense conditions of the gas before and after treatment.

A controller (shown schematically in FIG. 1) is preferably connected to one or more sensors and to a source of the chemical treatment agent in order to adjust the amount of the chemical treatment agent that is introduced by the source into the chemical treatment zone. This adjustment is made in response to the sensed condition or conditions detected by the sensor or sensors.

The controller can be selected based on the size and complication of the overall installation. Various control equipment is commercially available. For example, Allen-Bradley, 1201 South Second Street, Milwaukee, Wis. 53204, offers programmable logic controllers (the PLC500 series and the PLC5 series). These are expandable controllers which can accept various types of inputs and outputs. For smaller overall systems, a stand-alone controller can be used. For example, such a controller is available from Fischer & Porter Company, 125 East County Line Road, Warminster, Pa. 18974 (MC5000 series). These controllers are programmable but are not expandable and are pre-configured to accept a fixed number of inputs and outputs.

The controller can also be selected depending upon the nature of the source of the chemical treatment agent. For example, in one embodiment, the source of chemical treatment agent preferably includes a source of a chemical solution that is premixed for a particular decontamination process. The controller for such a source of premixed chemical solution preferably includes means for adjusting the volumetric flow rate at which the premixed chemical solution is introduced into the chemical treatment zone.

Mechanisms for adjusting volumetric flow rate are also commercially available. For example, volumetric metering pumps, which can accept control signals from a pump controller, are available from Milton-Roy, Flow Control Division, 201 Ivyland Road, Ivyland, Pa. 18974, which offers various metering pumps depending on system needs. Another method of adjusting flow rate is to use a loop of continuously flowing chemical solution pumped from its storage and back. Off this loop, a proportional control valve is employed to inject the chemical solution into the process as needed, based on signals from the controller. Such valves are available from Worcester Controls, 33 Locke Drive, Marlorough, Mass. 01752, for example. Control of the amount of chemical solution added may be accomplished by means of calculation within the controller based on the metering pump feed rate or by means of a flow meter. Flow meters are commercially available from Fischer & Porter Company, 125 East County Line Road, Warminster, Pa. 18974, for example, which offers various types and models, depending on the application, the chemical solution and the accuracy needed.

Alternatively, the source of chemical treatment agent optionally includes a source of water, a source of chemicals, and some means for adjusting the concentration of the chemicals in the water. For such a source of chemical treatment agent, the controller preferably includes means for adjusting the proportions of the chemicals in the water.

Such mechanisms are also commercially available. For example, where pH can be used to determine chemical concentration, a pH sensor can be installed in the feed line downstream from the location where the water and chemical are mixed. The controller would be attached to the pH sensor and would control the addition of chemical, by using equipment described previously, to a preset pH. Such pH sensors are available, for example, from Electro Chemical Devices, Inc., 23665 Via Del Rio, Yorba Linda, Calif. 92687.

Another method of adjusting concentration would be to add a controlled volume of chemical solution with a known concentration to a controlled volume of water, thereby creating a known dilute concentration. This can be accomplished using proportional control valves and flow meters, as described previously.

These are only examples of some control mechanisms and equipment for the addition of chemicals. Many equivalent or substitute systems are commercially available.

Operation of an apparatus and method according to this invention will now be described with general reference to the figures.

Contaminated gas to be treated is preferably passed into a lower portion of a gas treatment chamber, upwardly through a chemical treatment zone, upwardly through a biological treatment zone, and out from an upper portion of the gas treatment chamber. Referring to FIG. 2, contaminated air is preferably introduced via air connections 3 into air supply room 1 by any known means including, but not limited to, blowers, fans and equivalent devices capable of urging the gas to flow in a desired direction. Contaminated air then passes upwardly into gas treatment chamber 5. In so doing, air travels upwardly past rods 9, grating mat 10, plastic wires 11, substrate 12, biofiltration material 13, and outwardly to the atmosphere.

A chemical treatment agent is introduced in a predetermined amount from a source into the chemical treatment zone and the chemical treatment agent is caused to contact the gas, thereby inducing a chemical reaction. Referring to FIG. 2, chemical treatment agent is introduced via inlet tubes 14 and nozzles (not shown) so that the chemical treatment agent contacts the layer of substrate 12 and adheres to surfaces of the substrate. Any excess chemical treatment agent that is not retained by the substrate simply drips downwardly from the layer of substrate 12. Any such excess chemical treatment agent is optionally collected and recycled back into the chemical treatment zone, if desired.

Because any excess chemical treatment agent falls downwardly, under the influence of gravity, away from the biological treatment zone, the microbe population is protected against undue exposure to the agent. This may be quite beneficial where the treatment agent used is toxic to a portion of the microbe population.

The reaction between the chemical treatment agent and the gas contaminants in the chemical treatment zone preferably reduces the concentration of the contaminants to a level below which the contaminants are toxic to the microbe population. Also, the reaction in the chemical treatment zone preferably compensates for any decrease in the efficiency of the reaction in the biological treatment zone resulting from excessively high temperatures, excessively low temperatures, contaminant concentrations exceeding the physical capacity of the filtration substrate to absorb the compounds, contaminant concentrations exceeding the biological capacity of the microbial population within the filtration substrate to degrade the compounds, and other adverse conditions.

The gas, preferably after exiting the chemical treatment zone, is contacted with a microbe population inoculated into the biological treatment zone, thereby inducing a biological reaction between the microbe population and contaminants in the gas. Referring to FIG. 3, preferably after exiting the layer of substrate 12 in the upward direction, the contaminated gas enters the layer of biofiltration material 13. The contaminated gas contacts the microbe population inoculated into the filtration substrate.

The gas or filter is periodically or continuously monitored to detect at least one sensed condition that is indicative of the ability of the biological treatment zone to treat the contaminants in the gas. The sensed conditions most preferably include temperature and/or contaminant concentration, and those sensed conditions are most preferably monitored before and after treatment, although monitoring before, after or at some other stage of the process is also contemplated.

The predetermined amount of chemical treatment agent that is introduced from the source into the chemical treatment zone is adjusted in response to the sensed condition or conditions. In one embodiment, the adjustment is made by changing the volumetric flow rate at which a premixed chemical solution is introduced into the chemical treatment zone. In another embodiment, the adjustment is made by altering the concentration of the chemical by changing proportions of chemicals injected into a water source such as a water stream. In any embodiment, the adjustment is preferably accomplished automatically, without any need for a human operator to physically adjust the apparatus. Manual operation is, of course, contemplated as well.

The predetermined amount of chemical treatment agent that is introduced into the chemical treatment zone is preferably increased in response to a sensed increase in the concentration of contaminants in the gas. For example, if a rapid or significant increase in contaminant concentration is detected in the inlet air, the volume or concentration of the chemical introduced is preferably increased to avoid damage to the biological treatment zone or to avoid the release of a fugitive emission. Similarly, a detected increase in contaminant concentration in the outlet air is preferably followed by increased chemical volume or concentration until the sensed contaminant concentration falls to an acceptable level. The predetermined amount is preferably decreased in response to a sensed decrease in concentration as well.

Also, the predetermined amount of the chemical that is introduced is preferably increased when the temperature of the gas or biofilter exceeds or falls below a predetermined temperature range. For example, a decreased inlet temperature could indicate that the biofilter performance is likely to decrease. Also, a decreased outlet temperature could indicate an actual decrease in biofilter performance.

Such adjustments to the amount of agent that is introduced are made in response to sensed conditions that indicate that biological treatment is or may become compromised in some way. Most preferably, adjustments of chemical treatment adjust the incoming concentration of contaminants to a maximum level that the biological system can handle given the environmental conditions existing at the time treatment is taking place. Accordingly, the chemical treatment is adjusted to help maintain overall treatment efficiency.

Many modifications to the embodiments described herein may be made without departing from the spirit or scope of this invention as it is defined in the following claims. The apparatus is most preferably configured for upward flow of contaminated gas so that chemicals introduced during pre-treatment do not interfere with the microbe population. It is most preferable to position the biological treatment zone over the chemical treatment zone. In any configuration, chemical and biological treatment is performed within a common chamber, wherein the chemical treatment is particularly adapted to help compensate for reduced efficiency of the biological treatment under adverse conditions.

Also, the physical structure of the apparatus described herein may be changed with regard to its size, shape, materials, and other aspects. Although modular construction is preferred, a permanent structure is also contemplated. The method steps are optionally performed in any order.

What is claimed is:

1. An apparatus for removing contaminants from a gas, wherein said gas is forced into contact with a chemical treatment agent and a biological treatment agent, and wherein the amount of said chemical treatment agent that is introduced into said apparatus is adjustable in response to a sensed condition, said apparatus comprising:

a gas treatment chamber defining a passage through which said gas flows from an upstream portion of said gas treatment chamber to a downstream portion of said gas treatment chamber;

a chemical treatment zone positioned within said upstream portion of said gas treatment chamber;

a source of said chemical treatment agent connected to introduce a predetermined amount of said chemical treatment agent into said chemical treatment zone and into contact with said gas flowing through said chemical treatment zone, wherein said chemical treatment agent pre-treats at least one of said contaminants in said gas in said chemical treatment zone;

a biological treatment zone positioned within said downstream portion of said gas treatment chamber, said biological treatment zone comprising a filtration substrate and a microbe population for contact with said gas flowing through said biological treatment zone;

a sensor connected to detect temperature; and a controller connected to said sensor and said source to adjust said predetermined amount of said chemical treatment agent that is introduced by said source into said chemical treatment zone in response to said temperature detected by said sensor.

2. The apparatus defined in claim 1, wherein said sensor comprises a resistance temperature device.

3. The apparatus defined in claim 1, wherein said sensor comprises a thermocouple.

4. The apparatus defined in claim 1, wherein said sensor is connected to detect temperature at a location upstream from said biological treatment zone.

5. The apparatus defined in claim 1, wherein said sensor is connected to detect temperature at a location downstream from said chemical treatment zone.

6. The apparatus defined in claim 1, wherein said source of said chemical treatment agent comprises a source of a chemical solution and means for adjusting the flow rate at which said chemical solution is introduced into said chemical treatment zone.

7. The apparatus defined in claim 1, wherein said source of said chemical treatment agent comprises a source of water, a source of a chemical solution and means for adjusting the concentration of said chemical solution in said water.

8. The apparatus defined in claim 1, wherein said chemical treatment zone comprises a substrate onto which said chemical treatment agent is introduced.

9. The apparatus defined in claim 8, wherein said substrate comprises a porous material.

10. The apparatus defined in claim 1, wherein said filtration substrate in said biological treatment zone comprises an organic filtration medium.

11. The apparatus defined in claim 1, wherein said gas treatment chamber is modular for removal and replacement with respect to said apparatus.

12. The apparatus defined in claim 1, wherein said chemical treatment zone is positioned within a lower portion of said gas treatment chamber and said biological treatment zone is positioned within an upper portion of said gas treatment chamber above said chemical treatment zone.

13. The apparatus defined in claim 12, further comprising means for urging said gas upwardly through said gas treatment chamber.

14. An apparatus for removing contaminants from a gas, wherein said gas is forced into contact with a chemical treatment agent and a biological treatment agent, and wherein the amount of said chemical treatment agent that is introduced into said apparatus is adjustable in response to a sensed condition, said apparatus comprising:

a gas treatment chamber defining a passage through which said gas flows from an upstream portion of said gas treatment chamber to a downstream portion of said gas treatment chamber;

a chemical treatment zone positioned within said upstream portion of said gas treatment chamber;

a source of said chemical treatment agent connected to introduce a predetermined amount of said chemical treatment agent into said chemical treatment zone and into contact with said gas flowing through said chemical treatment zone, wherein said chemical treatment agent pre-treats at least one of said contaminants in said gas in said chemical treatment zone;

a biological treatment zone positioned within said downstream portion of said gas treatment chamber, said biological treatment zone comprising a filtration substrate and a microbe population for contact with said gas flowing through said biological treatment zone;

a sensor connected to detect at least one sensed condition related to the ability of said biological treatment zone to treat said contaminants in said gas, wherein said sensor comprises means for detecting said sensed condition at a location upstream from said biological treatment zone and at a location downstream from said biological treatment zone; and a controller connected to said sensor and said source to adjust said predetermined amount of said chemical treatment agent that is introduced by said source into said chemical treatment zone in response to said sensed condition detected by said sensor.

15. The apparatus defined in claim 14, wherein said sensor comprises means for sensing the concentration of said contaminants in said gas.

16. The apparatus defined in claim 14, wherein said sensor comprises means for sensing temperature.

17. A method for removing contaminants from a gas in an apparatus having a gas treatment chamber, a chemical treatment zone positioned within an upstream portion of said gas treatment chamber, a source of chemical treatment agent connected for delivering said chemical treatment agent into said chemical treatment zone, a biological treatment zone comprising a microbe population positioned within a downstream portion of said gas treatment chamber, a sensor connected to detect temperature, and a controller connected to said sensor and to said source of said chemical treatment agent, said method comprising the steps of:

(a) flowing said gas into an upstream portion of said gas treatment chamber, through said chemical treatment zone, through said biological treatment zone, and out from a downstream portion of said gas treatment chamber;

(b) supplying said chemical treatment agent in a predetermined amount from said source into said chemical treatment zone and causing said chemical treatment agent to contact said gas flowing through said chemical treatment zone, thereby inducing a reaction between said chemical treatment agent and at least one of said contaminants in said gas for pretreatment in said chemical treatment zone;

(c) causing said microbe population to contact said gas flowing through said biological treatment zone, thereby inducing a reaction between said microbe population and said contaminants in said gas in said biological treatment zone;

(d) detecting temperature with said sensor; and (e) adjusting said predetermined amount of said chemical treatment agent that is supplied from said source into said chemical treatment zone for said pretreatment in response to said temperature detected with said sensor.

18. The method defined in claim 17, wherein said adjusting step comprises increasing said predetermined amount of said chemical treatment agent in response to a sensed increase in said temperature above a maximum temperature.

19. The method defined in claim 17, wherein said adjusting step comprises increasing said predetermined amount of said chemical treatment agent in response to a sensed decrease in said temperature below a minimum temperature.

20. The method defined in claim 17, wherein said detecting step is performed downstream from said chemical treatment zone or upstream from said biological treatment zone.

21. The method defined in claim 17, wherein said adjusting step comprises controlling the flow rate at which said chemical treatment agent is introduced from said source into said chemical treatment zone.

22. The method defined in claim 17, wherein said adjusting step comprises controlling the concentration of said chemical treatment agent that is introduced from said source into said chemical treatment zone.

23. A method for removing contaminants from a gas in an apparatus having a gas treatment chamber, a chemical treatment zone positioned within an upstream portion of said gas treatment chamber, a source of chemical treatment agent connected for delivering said chemical treatment agent into said chemical treatment zone, a biological treatment zone comprising a microbe population positioned within a downstream portion of said gas treatment chamber, a sensor connect to detect at least one sensed condition, and a controller connected to said sensor and to said source of said chemical treatment agent, said method comprising the steps of:

(a) flowing said gas into an upstream portion of said gas treatment chamber, through said chemical treatment zone, through said biological treatment zone, and out from a downstream portion of said gas treatment chamber;

(b) supplying said chemical treatment agent in a predetermined amount from said source into said chemical treatment zone and causing said chemical treatment agent to contact said gas flowing through said chemical treatment zone, thereby inducing a reaction between said chemical treatment agent and at least one of said contaminants in said gas for pre-treatment in said chemical treatment zone;

(c) causing said microbe population to contact said gas flowing through said biological treatment zone, thereby inducing a reaction between said microbe population and said contaminants in said gas in said biological treatment zone;

(d) detecting with said sensor at least one sensed condition related to the ability of said biological treatment zone to remove said contaminants from said gas, wherein said detecting step is performed upstream and downstream from said biological treatment zone; and (e) adjusting said predetermined amount of said chemical treatment agent that is supplied from said source into said chemical treatment zone for said pre-treatment in response to said sensed condition detected with said sensor.

24. The method defined in claim 23, wherein said detecting step comprises sensing the concentration of said contaminants in said gas.

25. The method defined in claim 24, wherein said adjusting step comprises increasing said predetermined amount of said chemical treatment agent in response to a sensed increase in said concentration of said contaminants in said gas.

26. The method defined in claim 23, wherein said detecting step comprises sensing temperature.

\* \* \* \* \*